Dec. 30, 1941.   M. B. LANDIS   2,268,290
DOOR OPERATING MEANS
Filed Sept. 15, 1938   2 Sheets-Sheet 1
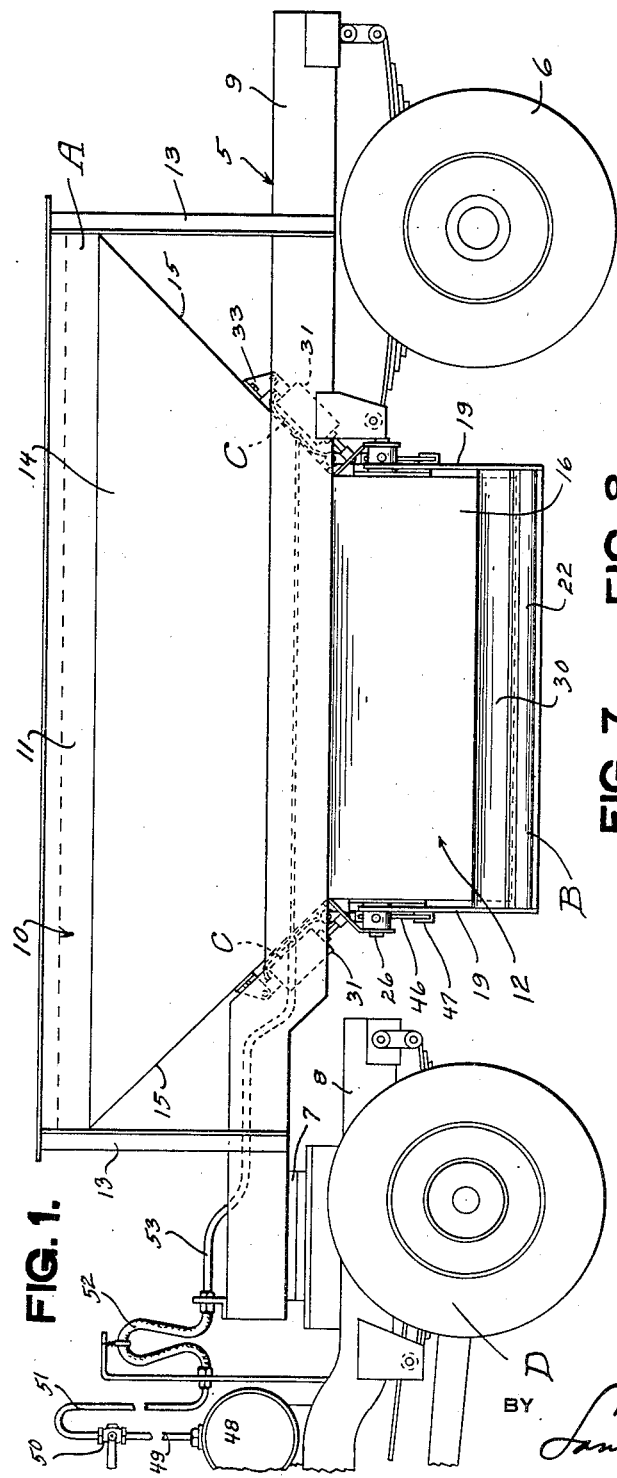
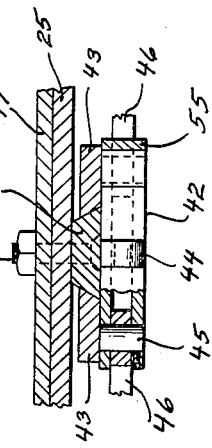
INVENTOR.
Miles B. Landis.
BY *Lancaster, Allwine and Rommel*
ATTORNEYS.

Dec. 30, 1941.   M. B. LANDIS   2,268,290
DOOR OPERATING MEANS
Filed Sept. 15, 1938   2 Sheets-Sheet 2
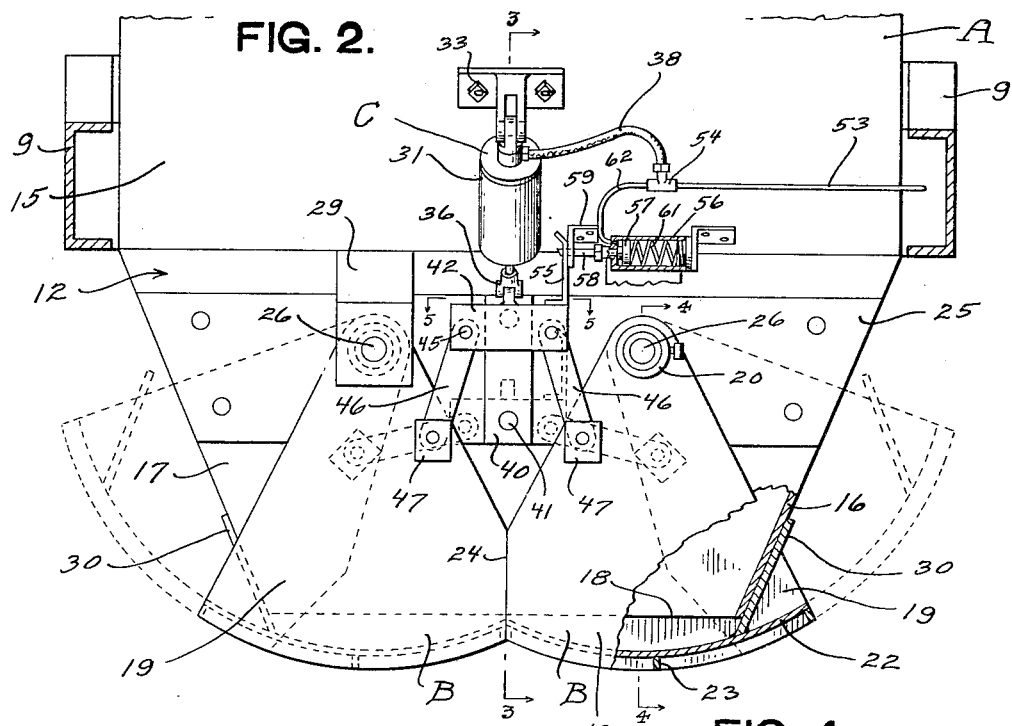
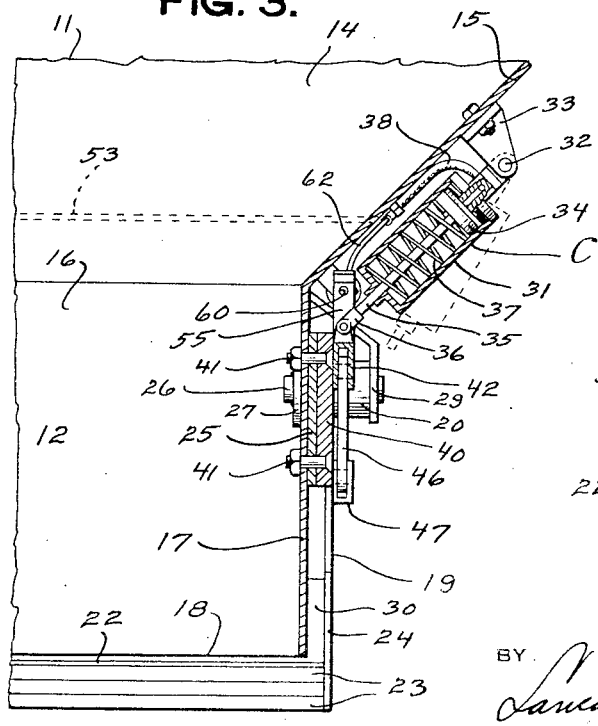
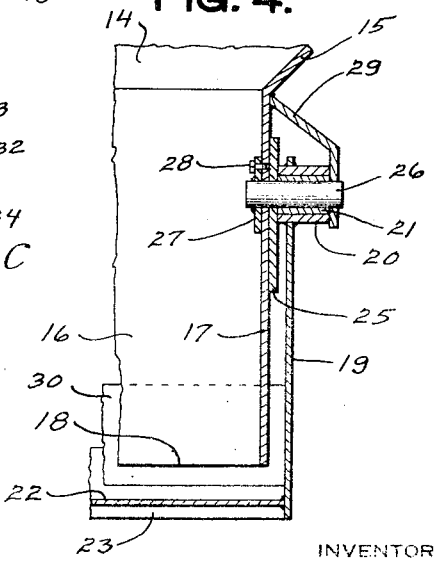
INVENTOR.
Miles B. Landis.
BY
Lancaster, Allwine & Rommel
ATTORNEYS.

Patented Dec. 30, 1941

2,268,290

UNITED STATES PATENT OFFICE 2,268,290

DOOR OPERATING MEANS

Miles B. Landis, Picher, Okla.

Application September 15, 1938, Serial No. 230,093

11 Claims. (Cl. 298—35)

The present invention relates to hopper type trailers, semi-trailers, wagons and similar material handling apparatus of that type adapted for transporting bulky materials such as earth, coal, gravel, etc., and having a hopper bottom thru which the entire load will discharge by gravity thru opening of the hopper doors. Heretofore such hopper type trailers have usually had the doors thereof open downwardly by the weight of the material and are mechanically operated by means of levers, trips and the like but this method has not been found satisfactory as the doors will sometimes hang up, and also requires the use of another operator on the ground for closing the doors after dumping.

The primary object of the present invention is to provide an improved hopper type trailer construction embodying fluid pressure operated hopper doors which may be controlled from a remote location, such as from the driver's seat of the tractor vehicle.

A further object of the invention is to provide improved pneumatically controlled door operating means for hopper bottom trailers and the like wherein the hopper doors may be opened to any desired extent, and wherein the doors normally swing to a closed position by gravity.

A further object resides in the specific door construction which prevents any binding or wedging of the doors by the material when the doors are being opened.

A still further object resides in the novel means for releasing the latch which serves to normally lock the hopper doors closed, said means being controlled by the same fluid pressure acting upon the door opening means.

A still further object resides in the manner of mounting the door operating means in a protected location beneath the hopper body, and the arrangement permitting renewal of parts when required.

Other objects and advantages of the invention will become apparent from the following detailed description, taken in connection with the accompanying drawings, forming a part of this specification and in which drawings—

Figure 1 is a view in side elevation of a hopper type semi-trailer embodying my invention, and a fragment of the rear portion of a tractor vehicle or truck to which the trailer is coupled.

Figure 2 is an enlarged view looking at one end of the hopper body with the hopper doors closed, and portions broken away and in section to illustrate certain details of construction.

Figures 3 and 4 are fragmentary vertical sections on the respective lines in Figure 2.

Figure 5 is an enlarged fragmentary section on line 5—5 of Figure 2.

Figure 6 is a view in side elevation of one of the hopper doors, looking at the outer edge thereof.

Figures 7 and 8 are detail sectional views thru the control valve, shown in various control positions.

Referring to the drawings in detail and wherein like reference characters designate corresponding parts thruout the several views, the letter A designates a hopper type semi-trailer constructed in accordance with this invention and having a bottom opening closed by a pair of hopper doors B, controlled by fluid pressure operated means C; and D may designate a tractor vehicle such as a truck or the like and to which the trailer is coupled.

While the invention has been shown by way of example, embodied in a semi-trailer, it is to be understood that the invention may be equally well embodied in various other vehicle constructions such for instance, as full or four wheel trailers, railway cars, etc.

In the example shown, the trailer A comprises a chassis frame 5 mounted at its rear portion upon ground wheels 6 and having its forward end provided with suitable coupling means 7 for connection upon the rear portion of the truck chassis 8. The trailer frame 5 has side sills 9 upon which is supported a hopper-like body 10 including a body portion 11 formed with a hopper 12 depending between the side sills 9, said hopper being open at its bottom. The body 10 may be supported at its ends by corner posts 13.

The body portion 11 is formed with vertical side plates or walls 14 and inclined floor or end sheets 15 which slope from the ends of the body to the ends of the hopper 12. The open bottomed hopper 12 has its side walls 16 extended in downwardly converging relation from the lower ends of the vertical side walls 14, while the end walls 17 of the hopper extend vertically downward from the lower ends of the inclined floor portions 15 whereby material in the body portion 11 moves by gravity into the hopper 12. The straight lower edges of the hopper walls 16 and 17 align on a horizontal plane and form a rectangular-shaped opening 18 at the bottom of the hopper adapted to be closed by the companion pair of hopper doors B.

Referring now to the construction and manner of suspending the hopper doors B for closing the hopper opening 18, these doors B are of like construction and are pendently hung at each end from the ends of the hopper 12 whereby the doors normally swing by gravity to a position closing the hopper opening 18. The doors are hinged on parallel axes extending longitudinally of the trailer and are arranged for opposite outward swinging simultaneously by the operating means C. Each hopper door B comprises a pair of substantially sector-shaped vertical end plates 19 provided adjacent the apex with tubular bosses 20 which extend thru the plates and axially align. These bosses 20 may be secured as by welding to the end plates, and each is provided with a bearing bushing 21. Secured at its ends as by welding to the end plates 19, is a curved or arcuate bottom plate 22 having its radius of curvature intersecting the axis of the aligning pivot bosses 20. Suitable reinforcing strips as at 23 are provided along the under side of the door bottom 22. The lower portion of the inner edges of the end plates 19 are beveled off as at 24 to provide vertical meeting edges at the longitudinal center of the hopper when the doors are closed.

Secured as by riveting and welding to the outer side of each of the hopper end walls 17, to extend horizontally across the upper portion thereof, is a reinforcing plate 25. Extended thru these reinforcing plates 25 and the hopper end walls 17 are horizontal hinge pins 26 upon which the hopper doors B are pivotally suspended for swinging movement laterally of the hopper. These hinge pins 26 are received in the bearing bushings 21 and as shown in Figure 2 are spaced to opposite sides of the longitudinal center of the hopper. Preferably welded to the inner end portion of each hinge pin 26 is a disc 27, which are disposed at the inner face of the hopper end walls 17 and secured by cap screws 28 to prevent rotation of the hinge pin and also allow for renewal thereof when desired. These removable hinge pins also permit ready assembling of the hopper doors B. The hinge pins 26 are supported at their outer ends by brace members or brackets 29 which may be welded to the ends of the hopper.

Thus it will be seen that the hinge pins 26 support the hopper doors for swinging movement laterally of the hopper, with the arcuate bottom plates 22 of the doors having a small clearance beneath the lower edges of the hopper side walls 16. When the hopper doors are closed as in Figure 2, the inner edges of the bottom plates 22 meet on the longitudinal center of the hopper with the meeting beveled edges 24 extending well above the lower edges of the hopper end walls 17 to prevent escape of material at the ends of the hopper. Secured as by welding or otherwise, to the upper side of each of the door bottom plates 22 and spaced inward a short distance from the outer edge of the bottom plates, are closure plates 30 which extend between the door end plates 19 and serve to close the clearance gaps beneath the hopper side walls 16. When the hopper doors close, these plates 30 engage the hopper side walls as shown in Figure 2. As also shown in Figure 2, the outer edges of the door end plates 19 traverse the plane of the hopper side walls 16 at a location spaced above the bottom of the hopper and this prevents escape of material at the ends of the closure plates 30.

Referring now to the fluid pressure operated means C for opening the hopper doors B, while not limited to such, it is preferably pneumatically operated from a source of compressed air on the tractor vehicle or truck D. This operating means C is duplicated at each end of the hopper 12 for preventing any torsional strain upon the hopper doors B in opening and it is believed that a description of one of the operating means will suffice.

Each door operating means C comprises an air cylinder 31 pivotally mounted at one end upon a horizontal pivot as at 32 upon a pivot bracket 33, beneath an inclined floor or end sheet 15 of the hopper body portion 11 to swing in a vertical plane at the longitudinal center of the trailer body 10. Reciprocally movable in the inclined cylinder 31 is a piston 34, having a piston rod 35 which projects from the lower end of the cylinder and is provided with a pivot clevis 36. Encircling the piston rod 35 within the cylinder 31 is a coil spring 37 which acts upon the piston 34 to normally urge the piston rod upwardly in the cylinder. Connected with and communicating with the upper end of the cylinder 31 above the piston 34 is a flexible hose 38 for admitting air under pressure into the upper end of the cylinder and forcing the piston downward against the tension of the coil spring 37.

The motion transmitting means for simultaneous operation of both hopper doors B, comprises a combined wearing and guide strip 40 mounted vertically upon the reinforcing plate 25 midway between the hinge pins 26, as by bolts 41 having their heads countersunk flush with the face of the strip. The upright or vertical edges of the guide strip 40 are beveled inwardly providing a dovetail guide as shown in Figure 5. Vertically guided on the guide strip 40 is a cross head 42 which is provided on its inner side with spaced apart guide blocks 43 having beveled adjacent edges engaging the beveled edges of the guide strip 40 whereby the cross head is held for sliding movement against the outer face of the guide strip during vertical travel of the cross head. Provided centrally of the cross head 42 is an apertured lug 44 to which the pivot clevis 36 on the piston rod 35 is pivoted on an axis parallel with the cylinder pivot axis 32.

Pivoted at one end in each end of the cross head 42, as upon pivot pins 45, are link arms 46 having their other or lower ends pivotally mounted in reinforcing clevises 47 mounted one upon each end plate 19 of the hopper doors below the hinge pins 26. Thus the cross head 42 and links 46 form a toggle joint wherein when the cross head is forced downward on the guide strip 40, the links exert outward swinging movement to the hopper doors into the dotted line showing in Figure 2 for discharging the load thru the hopper opening 18. As before mentioned, the operating means C is duplicated at each end of the hopper 12.

The door operating means C, is, in the example illustrated, operated by a source of compressed air from the truck D. In Figure 1, the truck D is provided with a storage tank or reservoir 48 for compressed air which may be served by any suitable compressor operated by the truck engine. Communicating with the air reservoir 48 is an air line 49 which preferably runs to the cab of the truck and has connected therein at a location readily accessible to the driver, a control valve 50. From the control valve 50 the air line extends to the rear of the truck as at 51 and is connected by a flexible hose 52 to the air pipe 53 on the trailer. This air pipe 53 has a T coupling 54 at each end of the trailer body and with the side outlet of which the flexible hose 38 of the respective air cylinders 31 connect for supplying air under pressure to the upper ends of the cylinders. The manner of operating the control valve 50 will be subsequently described.

While the hopper doors B are so constructed and hung as to return by gravity to a closed position, and to remain closed against tendency of the weight of the load to partially open the doors, a positive and automatically operated locking means is preferably provided at each end of the hopper for insuring that the doors be held closed during travel of the trailer. This air released locking means, as shown in Figure 2, is associated one with each of the cross heads 42 and embodies an upstanding latch bar 55 secured upon one end of the cross head for vertical movement therewith. Mounted horizontally upon the inclined floor sheet 15, at one side of the air cylinder 31, is a small air cylinder 56 in which is arranged a piston 57 provided with a piston rod 58 forming a latch pin for cooperating with the latch bar 55 when the hopper doors are in a closed position. The outer end of the piston rod 58 is movable thru a suitable guide 59 and moves thru an opening 60 in the latch bar 55 when the latch bar is raised, to thus hold the hopper doors closed. A coil spring 61 in the cylinder 56 acts upon the piston 57 to normally project the piston rod 58 to its locking position. Connecting the straight through opening of the T coupling 54 with the small unlocking air cylinder 56 is an air line 62 for admitting compressed air to act upon the piston 57 and move the piston inwardly against the action of the coil spring 61. This inward movement of the piston 57 retracts the piston rod or latch pin 58 from the latch bar opening 60 and releases the latch bar 55 so that the hopper doors may be opened by the larger air cylinders 31.

Referring again to the control valve 50 and particularly to Figures 7 and 8 of the drawings, the valve is provided with a release port 65 through which air in the system beyond the valve is permitted to escape and allow the hopper doors to close by gravity, aided by the coil springs 37 in the opening air cyinders 31. Figure 7 shows the valve in its off or closed position, venting the air cylinders 31 and 56 and closing off communication with the air supply reservoir 48. Figure 8 shows the valve in its open position, closing the vent port 65 and opening communication between the reservoir 48 and the cylinders 31 and 56.

In operation of the apparatus, it will be noted that the hopper doors are not forced open by the weight of the material acting thereon, but are moved to open position for releasing the load by the air pressure operated means C. When the hopper doors B are closed and latched as in Figure 2, material may be loaded in the hopper body 10 and be transported by the truck D without danger of the hopper doors working open due to vibration or other various causes. When desiring to dump or release the load, the truck operator merely needs to move the control valve 50 to the open position shown in Figure 8 whereupon air passes through the pipe 53 to each of the door opening cylinders 31 and each of the unlocking cylinders 56. Because of the fact that the cylinders 56 are smaller and of less cubical capacity than that of the cylinders 31, the pistons 57 will move sooner than the pistons 34 and release the latch bars 55 slightly in advance of the opening movement imparted to the hopper doors. Upon release of the latch bars 55, the cross heads 42 are forced downward on their guide strips 40 by the pistons 34 so that the hopper doors B are swung oppositely outwardly to an open position by the links 46. While the cylinders 31 are set at an angle to the thrust of the cross heads 42, this is taken care of by the pivotal mounting of the cylinders 31 at their upper ends and by the dovetail sliding connection between the cross heads 42 and their guide strips 40.

After the load has been discharged through the hopper opening 18, the control valve 50 is moved to the position shown in Figure 7 which closes off communication with the reservoir 48 and vents the cylinders 31 and 56 through the vent port 65 of the control valve. Upon release of pressure in the cylinders 31, the hopper doors B swing by gravity to a closed position, and are aided in closing by the coil springs 37 in the cylinders 31. As the air pressure is also released in the small cylinders 56, the coil springs 61 therein will project the piston rods or latch pins 58 so as to engage with the latch bars 55 and latch the hopper doors in the closed position.

Should the operator desire to only partially open the hopper doors, the control valve is first opened as in Figure 8 until the doors have opened to the desired extent and then moved to the dotted position in Figure 7, whereby the doors are held in this partially opened position.

Referring once again to the hopper doors B; by having the radius of curvature of the arcuate bottom plates 22 thereof intersect the pivotal axis of the doors, the clearance gap beneath the bottom edges of the side walls 16 of the hopper remain the same during swinging of the doors and prevents coarse material from binding the doors. While the operating means C is preferably provided at each end of the hopper to insure positive and better opening of the hopper doors without any twisting strain, one of the operating means may be dispensed with if so desired.

Changes in detail may be made to the form of the invention herein shown and described, without departing from the spirit of the invention or the scope of the following claims.

I claim:

1. A material handling and dumping device comprising a hopper having a bottom opening, doors movable by gravity action to positions closing the opening, fluid pressure operated means for opening the doors, fluid pressure released latch means for securing the doors in closed position, a single fluid pressure line having branches serving both of said means, and a single control valve in said line.

2. In a dumping device, a hopper having a bottom opening, hopper doors suspended from the ends of the hopper and normally swinging to a position closing the opening, fluid pressure operated means for opening the doors with opposite directions of movement, latch means for holding the doors closed, fluid pressure operated release means for the latch means and connected in parallel with the fluid pressure operated door opening means, and a single control valve for controlling both of said fluid pressure operated means.

3. In a hopper trailer having a hopper provided with an open bottom, a pair of hopper doors suspended at their ends upon the ends of the hopper, an air cylinder at each end of the hopper, a toggle joint connection between each air cylinder and adjacent ends of the doors for imparting opening movement to the doors, said doors closing by gravity action to close the hopper opening, and fluid pressure released latch means for the doors when in a closed position.

4. In a hopper trailer, a hopper having a bottom opening, a pair of hopper doors pivoted on parallel pivot axes and closed by gravity action over the opening, an air cylinder at each end of the hopper and each having a piston and a piston rod, a cross head connected to each piston rod, links connecting each end of each door with the adjacent cross head, and an air pressure line connected with each air cylinder for admitting air to the cylinders for opening the doors.

5. In a hopper trailer, a hopper having a bottom opening, a pair of hopper doors pivoted on parallel pivot axes and closed by gravity action over the opening, an air cylinder at each end of the hopper end each having a piston and a piston rod, a cross head connected to each piston rod, links connecting each end of each door with the adjacent cross head, pressure released latch means for retaining the doors closed, an air pressure line having connection with the air cylinders and also with the pressure released latch means, and a control valve in said pressure line.

6. In a hopper trailer, a hopper having end and side walls and a bottom opening, a pair of hopper doors pivotally suspended from the end walls for closing the bottom opening, a pair of hopper doors pivotally suspended from the end walls for closing the bottom opening, a cross head vertically guided on each end wall, links connecting the cross heads with adjacent ends of the doors for imparting outward swinging to the doors upon downward movement of the cross heads, fluid pressure operated means for imparting downward movement to the cross heads for opening the doors, latch means for the doors when in a closed position, fluid pressure operated release means for the latch means, a single fluid pressure line having branch connections with all of said fluid pressure operated means, and a control valve in said pressure line.

7. In a hopper trailer, a hopper body having an inclined end wall, a hopper having a vertical end wall and a bottom opening, hopper doors for closing the bottom opening, an air cylinder pivotally mounted at its upper end to the inclined end wall, a piston in the cylinder, a piston rod connected to the piston and projecting from the lower end of the cylinder, motion transmitting means between the piston rod and the hopper doors including a cross head vertically guided on the hopper end wall, and means for admitting air under pressure into the cylinder above the piston for imparting opening movement to the hopper doors.

8. In a hopper trailer, a hopper body having inclined end walls, a hopper having vertical end walls extending from the lower ends of the inclined end walls and having a bottom opening, a pair of hopper doors pivotally suspended from the hopper end walls and normally closing the bottom opening, and fluid pressure operated means for opening the doors, including air cylinders pivotally mounted at one end upon the under side of each inclined end wall at an angle to the line of thrust imparting opening movement to the hopper doors.

9. In a hopper trailer, a hopper body having inclined end walls, a hopper having vertical end walls extending from the lower ends of the inclined end walls and having a bottom opening, a pair of hopper doors pivotally suspended from the hopper end walls and normally closing the bottom opening, an air cylinder pivotally mounted at its upper end upon the under side of each inclined end wall, a piston in each cylinder, a piston rod extending from the lower end of each cylinder, a cross head vertically guided on each hopper end wall, a pivotal connection between each cross head and its companion piston rod, a toggle joint connection between each cross head and the adjacent ends of the hopper doors, and an air pressure line having connection with the cylinders above the pistons therein.

10. In a dumping device, a hopper having vertical end walls, side walls and a bottom opening, a pair of spaced apart hinge pins supported in each end wall, a pair of hopper doors pivoted on the hinge pins for swinging movement laterally of the hopper, said doors normally closing by gravity action over the bottom opening, a vertical dovetail guide on each end wall, a cross head held for vertical guided movement on each guide, a link connecting each end of each door with the cross heads, and means for imparting downward movement to the cross heads and causing outward swinging of the doors to an open position, including air cylinders pivoted at one end upon each end wall of the hopper.

11. In combination with a hopper having end and side walls and a bottom opening, a pair of hopper doors each including end plates overlying the hopper end walls and an arcuate bottom wall, means pivoting the doors by the end plates upon the hopper end walls on parallel axes for outward swinging movement beneath the lower edges of the hopper side walls, said arcuate bottom walls having their radius of curvature intersecting the pivotal axis of their respective doors, closure plates on the door bottom walls for closing the gap between the lower edges of the hopper side walls, and means for imparting simultaneous outward swinging movement to the hopper doors for release of material in the hopper.

MILES B. LANDIS.